(12) United States Patent
Gallacher et al.

(10) Patent No.: US 11,579,161 B2
(45) Date of Patent: Feb. 14, 2023

(54) ORIENTATION PRESERVED DAMPING FOR OBJECT TRACKING SUBJECTED TO HAPTIC STIMULUS

(71) Applicant: Robotiques Haply Inc., Montreal (CA)

(72) Inventors: Colin Gallacher, Kingwood, TX (US); Felix Desourdy, Boucherville (CA); Yi Ding, Montreal (CA)

(*) Notice: Subject to any disclaimer, the term of this patent is extended or adjusted under 35 U.S.C. 154(b) by 0 days.

(21) Appl. No.: 16/850,021

(22) Filed: Apr. 16, 2020

(65) Prior Publication Data

US 2020/0333370 A1    Oct. 22, 2020

Related U.S. Application Data

(60) Provisional application No. 62/834,477, filed on Apr. 16, 2019.

(51) Int. Cl.
*G01P 1/00*     (2006.01)
*G01P 15/08*   (2006.01)

(52) U.S. Cl.
CPC .............. *G01P 1/003* (2013.01); *G01P 15/08* (2013.01); *G01P 15/0802* (2013.01)

(58) Field of Classification Search
CPC ...... G01P 15/0802; G01P 15/08; G01P 15/18; G01P 1/003; G01P 1/02; G01P 1/023
See application file for complete search history.

(56) References Cited

U.S. PATENT DOCUMENTS

| | | | | |
|---|---|---|---|---|
| 3,592,422 A | * | 7/1971 | Paine | F16F 15/067 248/589 |
| 5,000,415 A | * | 3/1991 | Sandercock | F16F 15/02 248/550 |
| 5,623,248 A | * | 4/1997 | Min | B60R 25/1004 340/429 |
| 5,710,396 A | * | 1/1998 | Rogers | F16F 9/306 181/208 |
| 5,752,834 A | * | 5/1998 | Ling | G09B 9/12 434/55 |
| 6,022,005 A | * | 2/2000 | Gran | F16F 15/005 244/164 |
| 6,047,610 A | * | 4/2000 | Stocco | B25J 9/0072 901/23 |
| 6,241,059 B1 | * | 6/2001 | Fujita | A61G 3/006 188/267 |
| 7,806,697 B2 | * | 10/2010 | Mallaci | G09B 9/02 434/372 |

(Continued)

FOREIGN PATENT DOCUMENTS

CN    109555960    * 4/2019

OTHER PUBLICATIONS

English Translation of CN 109555960.*

(Continued)

*Primary Examiner* — Helen C Kwok
(74) *Attorney, Agent, or Firm* — Black McCuskey

(57) ABSTRACT

A mechanism to reduce the amplitude of acceleration experienced by IMUs for tracked objects while maintaining a more accurate estimate of the device orientation. The invention uses parallel mechanisms to maintain the correct orientation of an IMU while allowing for damped translational degrees of freedom to limit the degradation of performance while spatially tracking a body.

23 Claims, 17 Drawing Sheets

(56) References Cited

U.S. PATENT DOCUMENTS

| | | | |
|---|---|---|---|
| 7,950,633 B2* | 5/2011 | Hiley | F16M 11/123 267/136 |
| 2002/0055086 A1* | 5/2002 | Hodgetts | G09B 9/12 434/37 |
| 2004/0091348 A1* | 5/2004 | Kong | B25J 17/0266 414/735 |
| 2005/0162389 A1* | 7/2005 | Obermeyer | G01D 5/285 345/161 |
| 2006/0066574 A1* | 3/2006 | Kim | G05G 7/02 345/161 |
| 2006/0079817 A1* | 4/2006 | Dewald | A63B 21/4019 482/901 |
| 2011/0032090 A1* | 2/2011 | Provancher | G06F 3/03545 340/407.1 |
| 2013/0252209 A1* | 9/2013 | Guehring | G09B 9/08 434/69 |
| 2013/0299669 A1* | 11/2013 | Laurens | B64G 1/641 248/573 |
| 2014/0200087 A1* | 7/2014 | Vatcher | A63G 31/02 472/131 |
| 2015/0185108 A1* | 7/2015 | Baek | G01M 7/022 73/669 |
| 2015/0264262 A1* | 9/2015 | McClatchie | B60R 11/04 348/208.99 |
| 2016/0355238 A1* | 12/2016 | Charleston | A47C 7/002 |
| 2016/0370398 A1* | 12/2016 | Dressier | G01P 1/003 |
| 2017/0138816 A1* | 5/2017 | Proulx | G01M 7/02 |
| 2018/0221778 A1* | 8/2018 | Blum | A63G 21/20 |
| 2018/0284896 A1* | 10/2018 | Kearney | G06F 3/014 |
| 2019/0101981 A1* | 4/2019 | Elias | G09B 5/02 |

OTHER PUBLICATIONS

Majarean, Ana et al., "An Overview of Kinematic and Calibration Models Using Internal/External Sensors or Constraints to Improve the Behavior of Spatial Parallel Mechanisms", Sensors, 2010.*

Kim, Sung et al., "Development of a Novel Two-limbed Parallel Mechanism Having Schonflies Motion", Journal of Mechanical Engineering Science, 2013.*

Topic 4 Linkages; URL: https://dspace.mit.edu/bitstream/handle/1721.1/36391/2-007Spring-2003/NR/rdonlyres/Mechanical-Engineering/2-007Design-and-Manufacturing-Spring2003/ACC2CB09-78F7-4E4D-922C-E5E2A46BDC1A/0/Topic4Linkages_GW.pdf; Date Printed: Feb. 4, 2022.

Four-Bar Linkages; URL: http://dynref.engr.illinois.edu/aml.html; Date Printed: Mar. 8, 2022.

Chapter 5 Planar Linkages; URL: http://www.cs.cmu.edu/%7Erapidproto/mechanisms/chpt5.html; Date Printed: Feb. 4, 2022.

Chapter 4 Basic Kinematics of Constrained Rigid Bodies; URL: https://www.cs.cmu.edu/%7Erapidproto/mechanisms/chpt4.html; Date Printed: Feb. 4, 2022.

* cited by examiner

Figure 2A SIDE VIEW (200)　　Figure 2B FRONT VIEW (200)
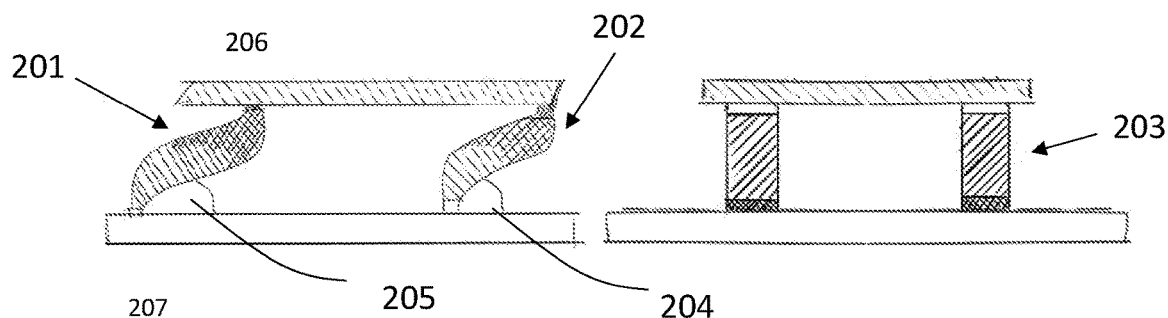
Figure 3A SIDE VIEW (300)　　Figure 3B FRONT VIEW (300)
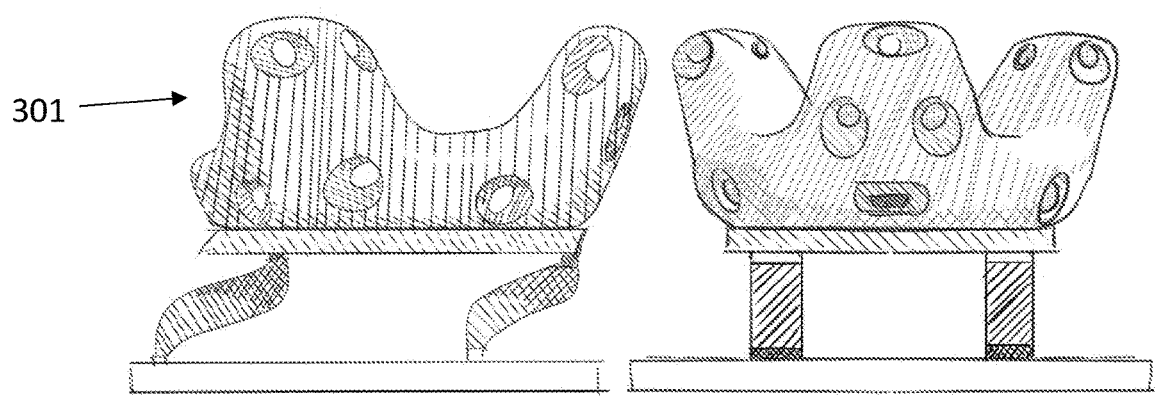

ORIENTATION PRESERVED DAMPING FOR OBJECT TRACKING SUBJECTED TO HAPTIC STIMULUS

PURPOSES OF THE INVENTION

The purpose of the invention is to dampen oscillatory and/or vibrational input stimuli to a tracking device in order to maintain the orientation of the tracked controller object when subjected to forced inputs.

BACKGROUND

It is common for tracked objects to use embedded inertial sensors to establish the states of a device. These sensors are often integrated into algorithms that estimate the state of the device based off of the interoceptive (on-body) sensor readings and then can be corrected by exteroceptive (off-body) sensors.

However, when a tracked object is subjected to a haptic stimulus that can lead to high accelerations of the tracked object this can cause the tracked objects to perform erratically. This ultimately causes the tracking to perform poorly and this can have devastating implications for any process or simulation that relies on tracking the position and orientation of the object faithfully. These issues arise frequently in the fields of virtual and augmented reality where haptic inputs are important for user immersion but conversely high amplitudes of acceleration that arise from haptic actuation can lead to loss of tracking.

Typical solutions have been to mount tracking units directly to haptic controllers which does not allow for adequate isolation from the input source and leads to poor performance for high amplitude accelerations of the controller caused by haptic inputs.

Other solutions have aimed to use damping pads which are common in drone technology. Because these damping pads can deform along several axes, they do not allow the tracked controller to maintain a more faithful estimation of the controller's attitude. The lack of orientation fidelity is particularly damaging in the domain of virtual reality, for example, as the aim of the controller is tied directly to the tracked orientation. Thus aiming, say, a virtual reality gun when subjected to haptic recoil would lead to changes in shot orientation that would negatively alter the trajectory of subsequent shots.

SUMMARY OF INVENTION

The present invention, in at least some embodiments, provides adequate decoupling of forced input stimuli from a tracked body while maintaining the tracked body orientation. Without wishing to be limited by a closed list, such decoupling is useful in certain applications where orientation tracking is vital for performance and small deviations in the absolute position accuracy can be more heavily tolerated. By "tracked body" it is meant a body with regard to which at least one of position, orientation, rotation, and/or linear distance moved is tracked.

The present invention provides an adequate decoupling of the device from the sensor on the tracked body through the use of parallel mechanisms to contain the orientation of the body while allowing for small translational motions to reduce the acceleration the IMU sensor is subjected to.

As the orientation is maintained, rotations of the tracked body are fixed with respect to the body subjected to haptic stimulus. Additionally, there is a maximum of three spatial degrees of freedom that can be constrained. However, it is necessary to provide adequate translational damping to reduce the amplitude of haptic stimuli reflected onto the tracked body. Depending on the application specifications these degrees are constrained appropriately to limit the spatial degrees of freedom.

The spatial decoupling mechanism is staged with an orientation preserving parallel mechanism. The objective is to allow for the tracked body to undergo acceleration but for these accelerations to have increased decoupling from the on-body sensor. Physical mechanisms that can preserve orientation while allowing for spatial translation can now be used in conjunction with spatial decoupling to allow for a reduction in the amplitude of acceleration the inertial sensors are subjected to.

As used herein, forced input relates to any type of stimulus involving physical force, a non-limiting example of which is a haptic stimulus.

According to at least some embodiments, there is provided a force dampening device for a sensor subjected to forced input, the device comprising a plurality of legs, a sensor mount and a system mount, wherein the legs comprise a flexible material, wherein each of the plurality of legs is connected to the sensor mount at one end and the system mount at an opposing end such that the sensor mount is maintained in a parallel orientation to the system mount as the legs bend according to force applied to the sensor, and wherein the sensor is mounted on the sensor mount; wherein the legs reduce an amount of force experienced by the sensor according to force applied to the system mount.

Optionally, the flexible material comprises a suitable semi-flexible polymer, metal with a torsional spring or a combination thereof, wherein the legs passively maintain the parallel orientation of the system mount and the sensor mount. Optionally, the flexible material comprises a suitable Young's modulus. Preferably the flexible material comprises a material having a Young's modulus in the range between 1 to 3 MPa, the material comprising polyethylene, viscoelastic elastomers or silicone rubber, or a combination thereof. More preferably, the material comprises Nitrile (NRB) and Butyl (IIR) families of elastomers having mechanical properties that fall within the range of 1-3 MPa for elastic modulus, 4-10 MPa for yield stress, and 8-20 MPa for tensile strength at fracture.

Optionally, the legs have an angle of from 30 to 60 degrees. Optionally, the legs have an angle of from 35 to 55 degrees. Preferably the legs have an angle of from 40 to 50 degrees.

Optionally, the legs comprise four legs arranged in a four-bar parallel mechanism. Optionally, the legs are arranged equidistantly at the front and the back of the sensor mount and the system mount. Optionally, each of the legs comprises three sections, a first section connected to the sensor mount, a second section connected to the first section, and a third section disposed between and connected to the second section and the system mount, wherein the first and third sections are thinner than the second section. Preferably, the second section becomes thicker in a graduated manner from an end nearest the first section to a midpoint, and then becomes thinner in a graduated manner from the midpoint to an end nearest the third section. Optionally, the midpoint is not located equidistant between the first and third sections. Also preferably the second section is from 1.5 to 5 times thicker than each of the first and third sections. Also preferably the system mount further comprises a flexible layer comprising a flexible material, wherein the third sections are connected to the flexible layer of the system mount.

Optionally, the legs comprise three legs arranged in a tripod arrangement, wherein each leg comprises two sections and a hinge, wherein one end of a first section is connected to the sensor mount and a second end is connected to the hinge, and wherein one end of a second section is connected to the hinge and a second end is connected to the system mount.

Optionally, the system mount is formed as a linear rail allowing motion in one direction and further comprises a flexible material for at least partial dampening of motion.

Optionally, the legs have an S-shape.

According to at least some embodiments, a dampening system, comprising a sensor and a force damping device, the force damping device comprising a plurality of legs, a sensor mount and a system mount, wherein the legs comprise a flexible material, wherein each of the plurality of legs is connected to the sensor mount at one end and the system mount at an opposing end such that the sensor mount is maintained in a parallel orientation to the system mount as the legs bend according to force applied to the sensor, and wherein the sensor is mounted on the sensor mount; wherein the legs reduce an amount of force experienced by the sensor according to force applied to the system mount. Optionally, the sensor is selected form the group consisting of an IMU and an accelerometer. Preferably, the system further comprises a tracked body, wherein the sensor tracks a motion of the tracked body, wherein the force dampening device is situated between the sensor and the tracked body. Optionally, the tracked body is selected from the group consisting of a drone and an object for providing haptic feedback.

According to at least some embodiments there is provided a haptic device, comprising an actuator, a sensor to measure device state and a passive mechanical means to isolate a sensor signal in a degree of freedom of the measured device state, wherein the passive mechanical means comprises a leg disposed between the sensor and the actuator, wherein the leg comprises a flexible material.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIGS. 2A and 2B depict the side and front views, respectively, of a possible configuration of the parallel mechanism haptic dampening system;

FIGS. 3A and 3B depict the side and front views, respectively, of a possible configuration of the parallel mechanism haptic dampening system with an off-the-shelf virtual reality tracking module attached;

DESCRIPTION OF AT LEAST SOME EMBODIMENTS

Figure 1:
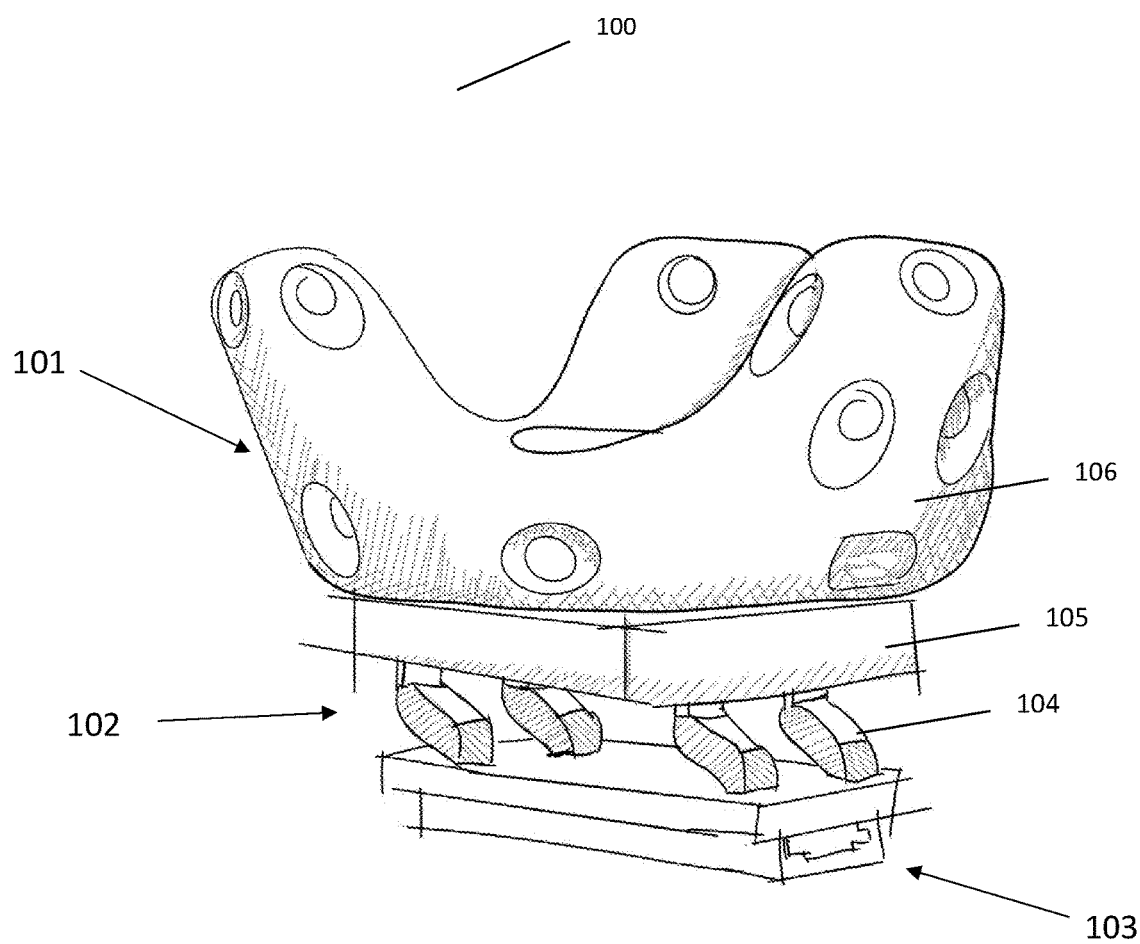
FIG. 1 shows an exemplary embodiment of a damping device plus a tracker, including an exemplary configuration of the parallel mechanism haptic dampening system mounted below.

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise. It will be further understood that the terms "comprise" and/or "comprising" when used in this specification, specify the presence of stated features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention. The components of the invention include but are not limited to an orientation preserving mechanism and translational damping element to provide adequate decoupling of the device from the inertial measurement unit to increase the robustness of state estimation algorithms to haptic and vibratory stimuli. This dampening unit can reduce acceleration reflected to the IMU in either one (FIGS. 1-5), two (not shown), or three (FIG. 8) translational degrees of freedom while maintaining the orientation of the IMU sensor. The IMU sensor may be replaced by an accelerometer or a combination of sensors that includes an accelerometer.

The dampening unit reduces acceleration but does not eliminate it, while maintaining the proper sensor orientation. Without wishing to be limited by a closed list, such a reduction in acceleration maintains accuracy of sensor measurements for haptic feedback. For example, for a video game, the user may hold a virtual object in his or her hand in the game, which represents an actual physical object in the user's hand. If this virtual object connects with another physical object, or another person (whether another player or a non-layer character), it is preferable that the user holding the object would feel an impact through the actual physical object in their hand.

However, the actual physical object may be a game controller, which in the known art is not designed to withstand high amplitude haptic feedback. In the known art, when a game controller is subject to many vibrations, it may produce false sensor measurements. The game controller in the known art typically featured an accelerometer to determine orientation, rigidly connected to a haptic motor. This rigid connection may cause the haptic motor, for example, to induce excess vibrations in the accelerometer or other sensor, which then provides false measurements.

The false measurements may cause the game play engine to place the user in a false position or otherwise to induce inaccuracies in game play. For example, if the physical object (game controller) represents a virtual object in the game (such as a weapon for example), the game play engine may place the virtual object at a distant location from the user's virtual character in the game, due to inaccuracies in measurements caused by the excessive vibration of the accelerometer or other sensor.

A better solution would reduce the effect of the haptic motor vibrations on the accelerometer itself, while still enabling the accelerometer to report an accurate location and orientation of the physical object being tracked. Initial solutions only considered the problem of dampening (reducing) the haptic motor vibrations, while failing to address the problem of location and orientation. Thus, the background art does not provide a satisfactory solution to this problem.

Turning now to the drawings, FIG. 1 shows an exemplary embodiment of the damping device with a tracking device. The tracking device may comprise any suitable type of tracking device, but preferably features an IMU or other sensor that is sensitive to movement.

Without wishing to be limited by a closed list, the damping device increases the robustness of the state estimation to haptic and vibratory stimuli while still maintaining a faithfully tracked object attitude. The damping device is expected to reduce the volatility of movement changes, by reducing the rate and/or extent of change in the position of the tracked device. However, such a reduction in volatility is actually expected to increase accuracy in determining the position, rate, direction and/or angle of movement of the tracked device.

FIG. 1 depicts a tracker with an exemplary configuration of the parallel mechanism haptic dampening device mounted below. A tracker system 100 comprises a tracker 106, which may be any suitable off the shelf tracker, including but not limited to the HTC Vive Tracker as shown. Tracker 106 is attached to, or integrably formed with, a damping device 102. Damping device 102 comprises a an orientation preserving parallel mechanism or alternatively an out of plane dampening mechanism. For example, damping device 102 preferably constrains yaw and pitch with regard to orientation. For example, damping device 102 may permit vertical (x-axis) movement, while constraining y-axis and/or z-axis movement. Permitting a limited amount of vertical movement enables the user (not shown) to feel haptic feedback, while avoiding problems of locating and/or orienting tracker 106.

The damping may be achieved by, but is not limited to, constructing a compliant parallel mechanism out of a viscoelastic material for a passive damping, through the use of passive spring or dampening elements fastened to a rigid orientation preserving mechanism, or through, but not limited to, the use of active systems that control the actuation of the parallel mechanism to reduce the amplitude of acceleration reflected to the haptic controllers.

For example, as shown in FIG. 1, damping device 102 may comprise a plurality of parallel legs 104, attached to, or integrably formed with, a mount 105. Legs 104 preferably comprise a suitable semi-flexible polymer and/or metal with a torsional spring. The material is preferably selected for a suitable Young's modulus. Preferably such a suitable modulus is in the range between 1 to 3 MPa for materials such as polyethylene to types of viscoelastic elastomers materials, including without limitation types of silicone rubber. Preferably the selected material(s) have adequate viscoelastic damping properties for the mechanism. Further non-limiting examples include materials belonging to the Nitrile (NRB) and Butyl (IIR) families of elastomers that possess mechanical properties that fall within the range of 1-3 MPa for elastic modulus, 4-10 MPa for yield stress, and 8-20 MPa for tensile strength at fracture.

These elastomers have some suitable properties in that they exhibit high vibrational damping and possess a nearly linear spring constant when subjected to strains of to 200% in shear loading. Such properties make these elastomers suitable candidate materials for the applications described. If the parallel mechanism linkages feature a thinner section, the width of the thin section of the parallel mechanism linkages, as shown for example in FIG. 10 as ends 1012 and 1014, are preferably selected to account for the desired range of travel of the IMU body to filter out the haptic signals based upon the load applied by the tracked body.

The effective stiffness is also a property of the shape that the device takes. As shown herein, preferably the thickness of legs 104 is reduced at attachment points, such that damping device 102 bends around these attachment points (also as shown in FIG. 10). Bending around these attachment points ensures that damping device 102 behaves as a parallel mechanism. Legs 104 may also have an S-shape as shown in FIG. 2, which also provides control with regard to the location and direction of bending.

The angle of legs 104 is preferably selected to permit movement in a suitable direction, such as the vertical (x) axis, while restraining movement in other direction(s). For example, legs 104 are preferably at a 45 degree angle, which permits vertical axis motion but not motion in other axes. Optionally, legs 104 have an angle of from 30 to 60 degrees, preferably from 35 to 55 degrees, and more preferably from 40 to 50 degrees. Such a range may be contrasted with such legs being provided at an angle of 90 degrees, which would permit a great deal of horizontal motion, but not a great deal of vertical motion (not shown).

Mount 105 is preferably a single mounting platform, on which tracker 106 is mounted or integrably formed. Mount 105 is preferably a stiff planar surface for maintaining the orientation of tracker 106. Tracker 106 maintains a fixed position relative to mount 105, but a relative position with regard to system mount 103. System mount 103 is then mounted onto an object to be tracked (not shown, see FIG. 9 for example).

Legs 104 preferably feature a viscoelastic material or other passive damping material with a Young's modulus as previously described. The size of the legs depends upon the size of mount 105 and system mount 103, and also the size and weight of tracker 106. For a tracker that is suitable for game play for example, the length of legs 104 is preferably from about 1 mm to about 30 mm and more preferably from about 10 mm to about 25 mm other lengths may be selected according to the application, as for example in the embodiment of FIG. 7. Alternatively or additionally legs 104 may comprise an active damping mechanism as shown in greater detail below.

A translational damping element 101 provides adequate decoupling of the device held by the user (not shown) from the inertial measurement unit contained within tracker 106 to increase the robustness of state estimation algorithms to haptic and vibratory stimuli.

The damping may be achieved by, but is not limited to, constructing a compliant parallel mechanism for system mount 103 out of a viscoelastic material for a passive damping, through the use of passive spring or dampening elements fastened to a rigid orientation preserving. System mount 103 is preferably formed as a linear rail that allows motion in one direction with a flexible material that also causes dampening of some motion. System mount 103 is preferably featured for applications in which more recoil or motion occurs from one direction in particular, such that system mount 103 reduces the amount of recoil in that particular direction.

Element 101 or system mount 103 may also be supplemented by one or more active systems that control the actuation of the parallel mechanism to reduce the amplitude of acceleration reflected to the haptic controllers (not shown).

Without wishing to be limited by a closed list, damping device 102 allows relative motion between two parallel surfaces while maintaining the surfaces remain parallel throughout the relative motion. In this non-limiting example, damping device 102 comprises an offset parallel four-bar mechanism. In the mechanical arts, a "four-bar" mechanism or linkage necessarily connotes a linkage formed by rigid bodies that are interconnected at nodes, as demonstrated by "Topic 4 Linkages GW" https://dspace.mit.edu/bitstream://handle/1721.1/35391/2-007 Spring-2003/NR/rdonlyres/Mechanical-Engineering/2-007Design-and-Manufacturing-ISpring2003/ACC2CB 09-78F 7-4E4D-922C-E5E2A46BDC1A/0Topic4Linkages_GW.pdf), "Four-Bar Linkages" (http://dynref.engr.illinois.edu/aml.html), and "Chapter 5 Planar Linkages" (http://www.cs.cmu.edu/%7Erapidproto/mechanisms/chpt5.html). The term "body" as used in connection with a four-bar mechanism or linkage is used synonymously with the term "bar," as shown by "Chapter 4 Basic Kinematics of Constrained Rigid Bodies (https://www.cs.cmu.edu/%7Erapidproto/mechanisms/chpt4.html). The mid-sections of bodies/bars of a four-bar linkage in the mechanical arts do not deform during operation.

Force is applied to system mount 103 as forced input, for example for haptic feedback or for other reasons. Legs 104 preferably reduce the amount of force applied to the sensor (not shown) in tracker 106 due to the force applied to system mount 103, in comparison to the amount of force that would be applied to the sensor in the absence of legs 104 and/or damping device 102, while still maintaining the parallel orientation of mount 105 and system mount 103.

FIG. 2A depicts the side view and FIG. 2B depicts the front view of a possible configuration of the parallel mechanism haptic dampening system. A system 200 preferably features two pairs of parallel moving linkages 201 and 202, connecting the base 207 to the mounting surface 206. The parallel moving linkages are preferably maintained at select angles to allow for the desired dampening motion. The moving linkages 201 and 202 of the mechanisms can be made out of, though not limited to, a compliant material that has viscoelastic properties that can passively dampen the motion of the IMU. They could also be actively controlled through actuation mechanisms to dampen the IMU motion (not shown).

The selection of the angle of moving linkages 201 and 202 also allows for modifying the initial direction of damping when the tracker is subjected to a high acceleration. The selection of an angle 204 of 45 degrees, for example, as previously described, allows for an initially balanced vertical and horizontal acceleration. By selecting angles 205 smaller than 45 degrees we ensure that more travel is done in the vertical direction which allows us to reduce the IMU acceleration in the vertical direction. Angles 204 and 205 may be the same or different.

Linkages 201 and 202 together comprise another example of an offset parallel four-bar mechanism. View 203 shows a front view of this mechanism.

FIGS. 3A and 3B depict the side and front views, respectively, of a possible configuration of the parallel mechanism haptic dampening system with an off-the-shelf virtual reality tracking module attached. As shown, a system 300 features a tracker 301, which may for example comprise an off the shelf HTC Vive tracker. Such a tracker may be used in VR (virtual reality) applications and gaming applications more generally, and represents a non-limiting example of a tracking system with an IMU.

Figure 4:
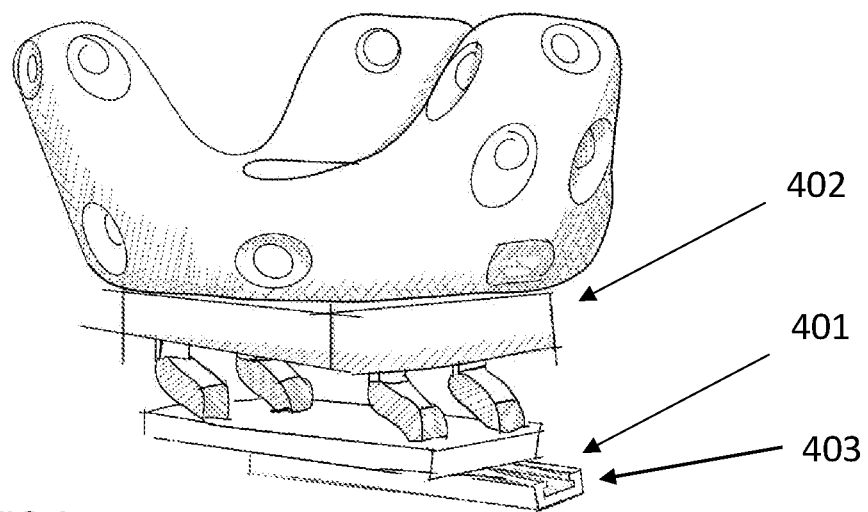
FIG. 4 depicts a possible configuration of the parallel mechanism haptic dampening system in a typical pose not subjected to haptic input.

FIG. 4 depicts a possible configuration of the parallel mechanism haptic dampening system in a typical pose not subjected to haptic input. For instances where a high acceleration is experienced along a linear axis, as is the case for a haptic gun controller experiencing recoil, the translational damping along the axis of recoil can be achieved through a one degree of freedom translational damper 401 coupled to an orientation preserving parallel mechanism 402. This allows for two translation degrees of freedom, one along the axis of the linear damper and one normal to the parallel planes. Translational damper 401 comprises a linear rail with a viscoelastic damping from a rubber dampener 401 along the axis of translation, which as previously described for FIG. 1, preferably comprises a flexible material.

Figure 5:
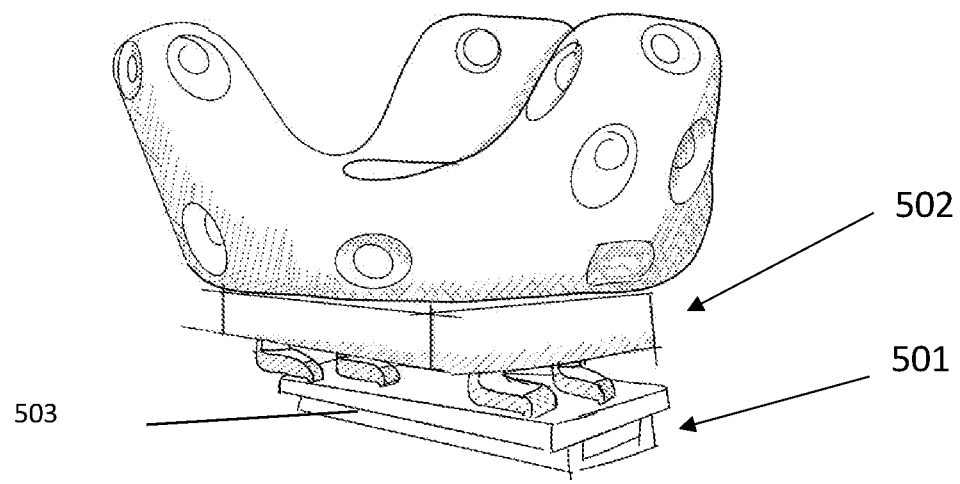
FIG. 5 depicts a possible configuration of the parallel mechanism haptic dampening system in a typical pose subjected to haptic input.

FIG. 5 depicts a possible configuration of the parallel mechanism haptic dampening system in a typical pose subjected to haptic input. Translational damper 501 comprises four legs 503, which upon being subject to downward motion through haptic input, lowers platform 502. The motion of the parallel planes can be seen in the platform height differences between FIGS. 4 and 5.

Figure 6A:
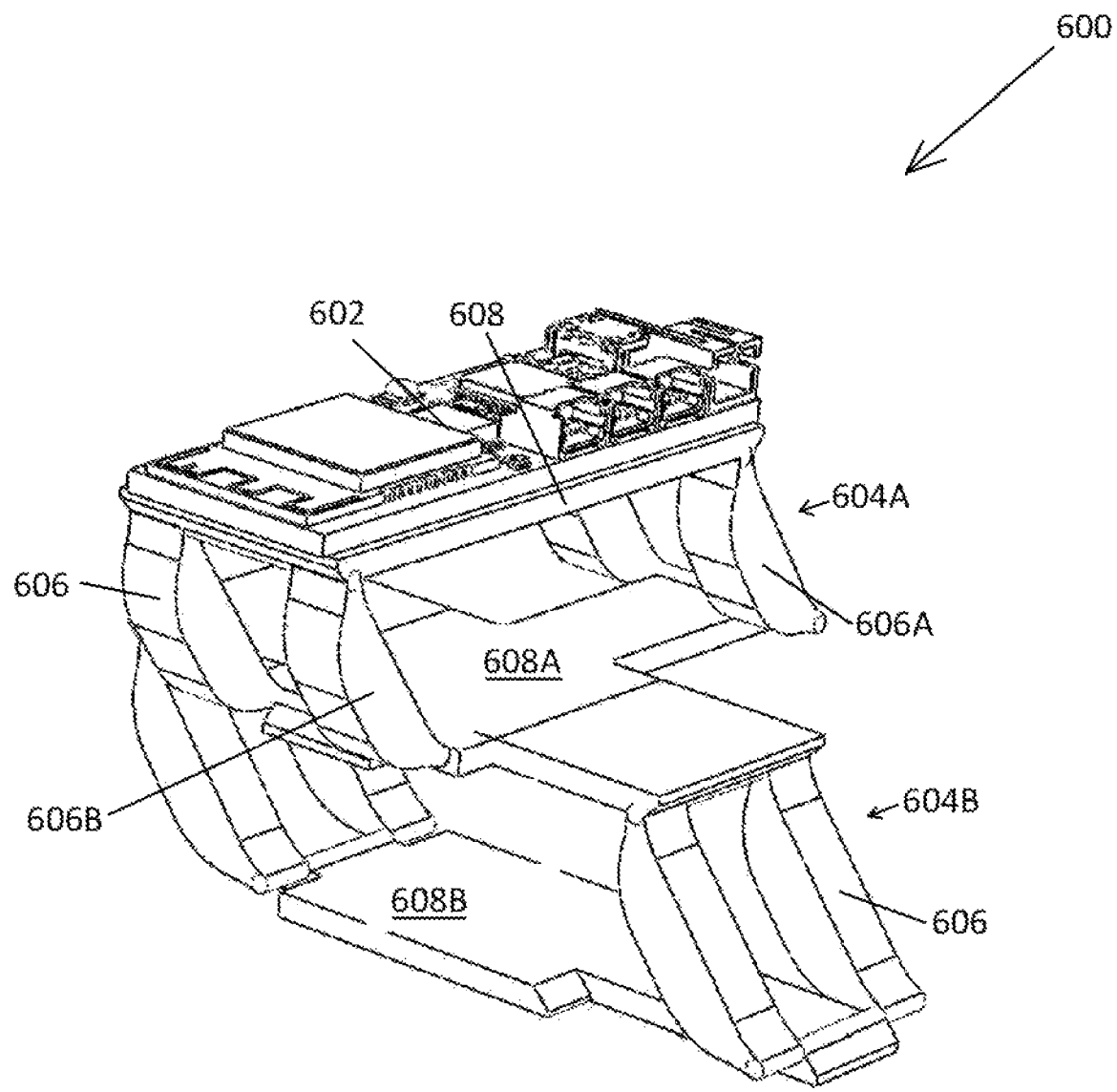
FIGS. 6A and 6B depict a possible configuration of stacking two parallel damping mechanisms on top of one another to increase the damping along the vertical direction, such that multiple parallel damping mechanisms may be stacked on top of one another to achieve increased dampening effects.
Figure 6B:
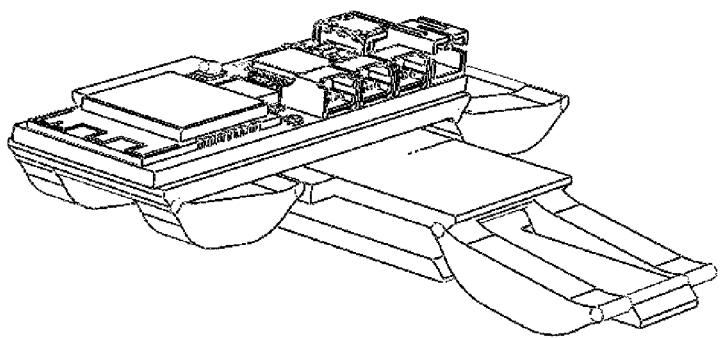

FIGS. 6A and 6B depict a possible configuration of stacking two parallel damping mechanisms on top of one another to increase the damping along the vertical direction. Such stacking reduces the horizontal travel. As shown, a system 600 features a sensor 602, in this non-limiting example comprising a circuit board with the sensor mounted thereon, as described in greater detail with regard to FIG. 7. System 600 features two damping devices 604A and 604B, mounted on top of each other cross-ways, in a relative 90 degree orientation in this non-limiting example. This orientation counter-balances the horizontal forces and increases damping the vertical direction. As for other embodiments shown herein, each damping device 604A and 604B features a plurality of legs such as referenced at 606, 606A, and 606B. Legs 606, 606A, 606B are variously mounted to mounts 608, 608A, and 608B. As shown in FIG. 6A, the legs 606A and 606B and the sensor mount 608 and the system mount 608A are a parallel kinematic mechanism in the form of at least one four-bar, parallelogram linkage with the plurality of legs 606A, 606B defining a first bar and second bar and the sensor mount 608 defining a third bar and the system mount 608A defining a fourth bar.

Figure 7:
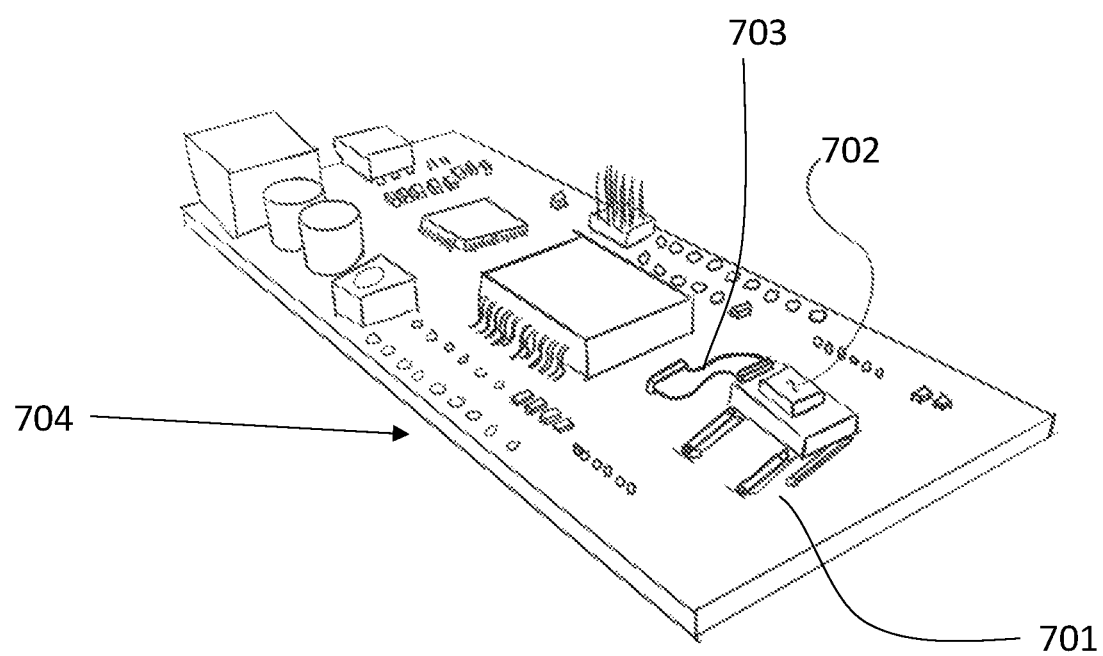
FIG. 7 depicts a possible use of the parallel mechanism haptic dampening system attached directly between an IMU and a circuit board.

FIG. 7 depicts a possible use of the parallel mechanism haptic dampening system attached directly between an IMU and a circuit board. The device could either be physically mounted through a soldered connection onto the board with leads that connect to the IMU decoupling the motion of the IMU from the board. Damping mechanism 701 preferably comprises a miniature parallel damping mechanism mounted directly to a circuit board 704. Circuit board 704 comprises any suitable printed circuit board which would have the components as shown herein mounted thereon. A sensor 702 may comprise an IMU or other suitable sensor, and may also feature a planar mount onto which a suitable sensor may be mounted. A connector 703 transmits data between sensor 702 and circuit board 704.

Without wishing to be limited by a closed list, rather than using a bulky large tracking device, damping mechanism 701 may be relatively small, due to the direct mount onto circuit board 704. Such a direct mount has damping properties for the sensed values that would maintain orientation but filter out high frequency forced inputs.

Figure 8:
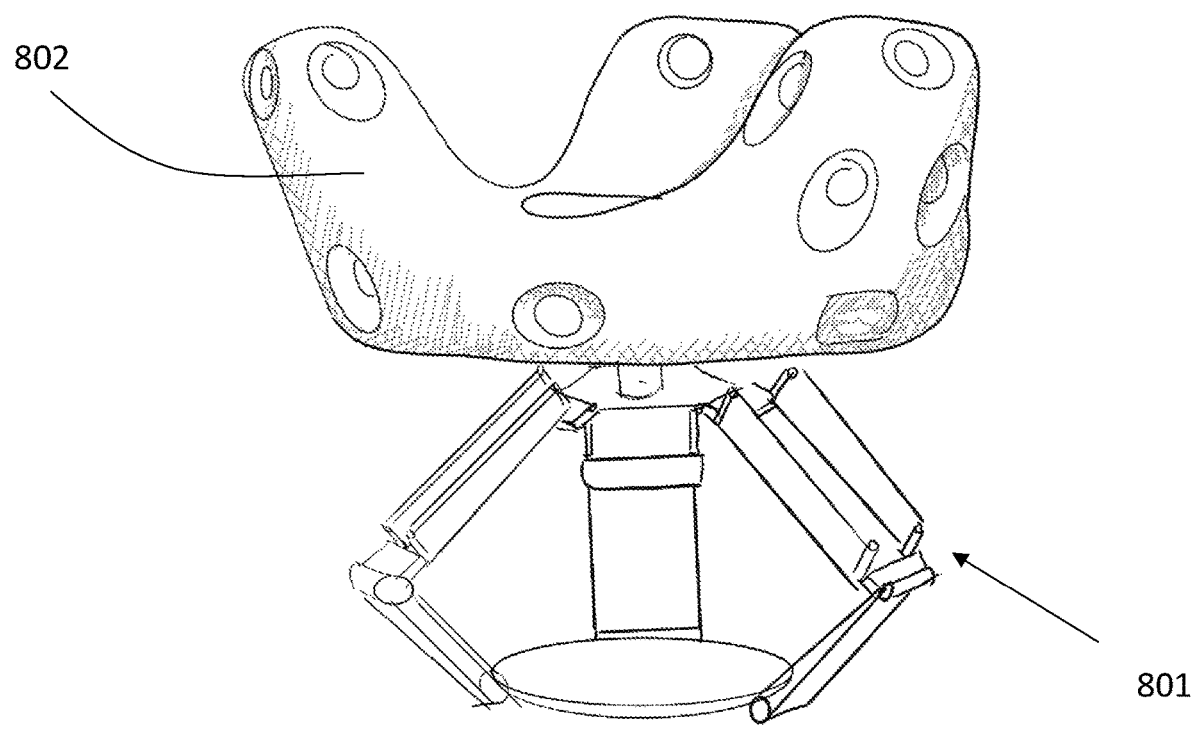
FIG. 8 depicts a parallel delta mechanism haptic dampening system used to dampen three translational degrees of freedom while maintaining sensor orientation.

FIG. 8 depicts a parallel delta mechanism haptic dampening system used to dampen three translational degrees of freedom while maintaining sensor orientation. The parallel delta mechanism consists of three four-bar, parallelogram arm linkages. The linkages allow for relative motion between the base and mounting surface while constraining any relative rotational motion ensuring the ensuring the surfaces remain parallel with the same orientation.

An orientation preserving parallel mechanism 801 may also allow for out of plane dampening. Mechanism 801 acts to increase the robustness of the state estimation to haptic and vibratory stimuli while still maintaining a faithfully tracked object attitude. Mechanism 801 represents a delta mechanism that can replace the previously described offset parallel four-bar mechanism.

Figure 9:
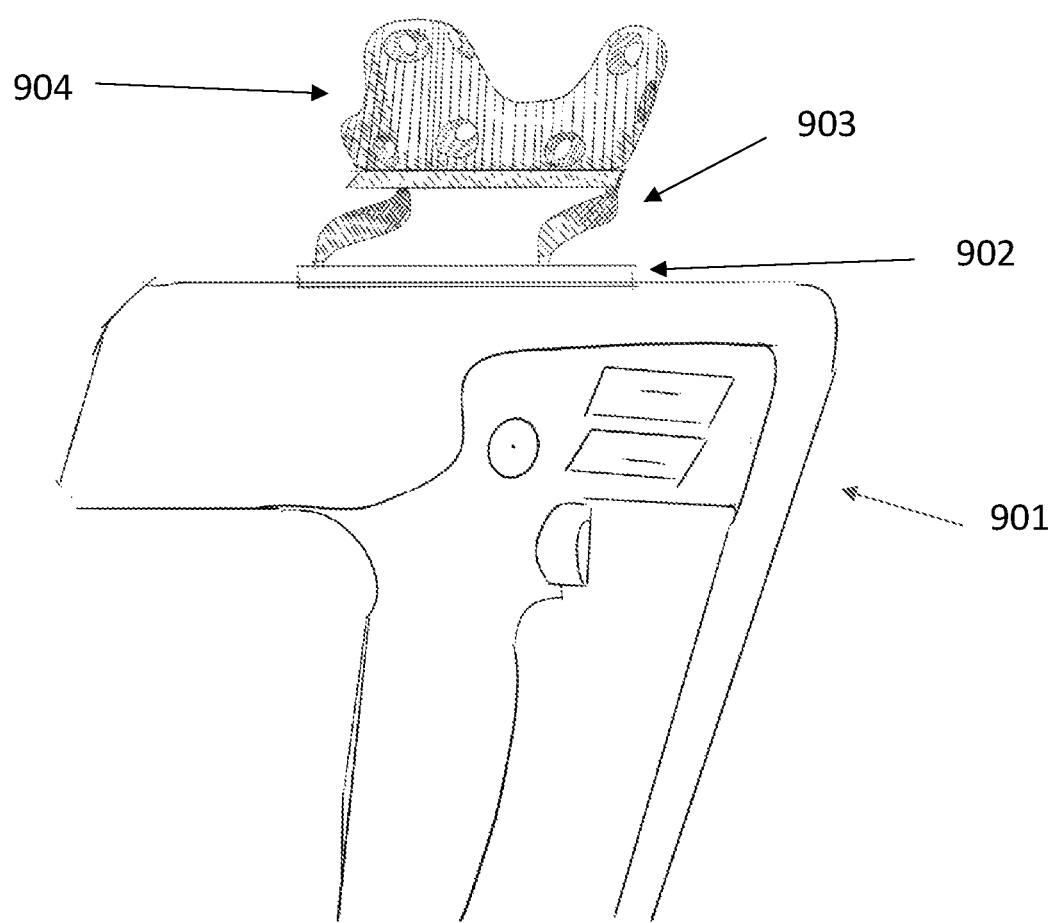
FIG. 9 depicts a possible haptic controller, linear damper, parallel damping mechanism, and tracking assembly.

FIG. 9 depicts a possible haptic controller, linear damper, parallel damping mechanism, and tracking assembly. An orientation preserving decoupling mechanism 903 and a translation constraint mechanism 902 may be placed between the on-body sensor 904 and the tracked body 901. This will allow for improved decoupling of the accelerations experienced by the translational sensors in IMU (Inertial Measurement Unit). Tracked body 901 is a non-limiting example of an object for providing haptic feedback to a user grasping the object (not shown).

Figure 10A:
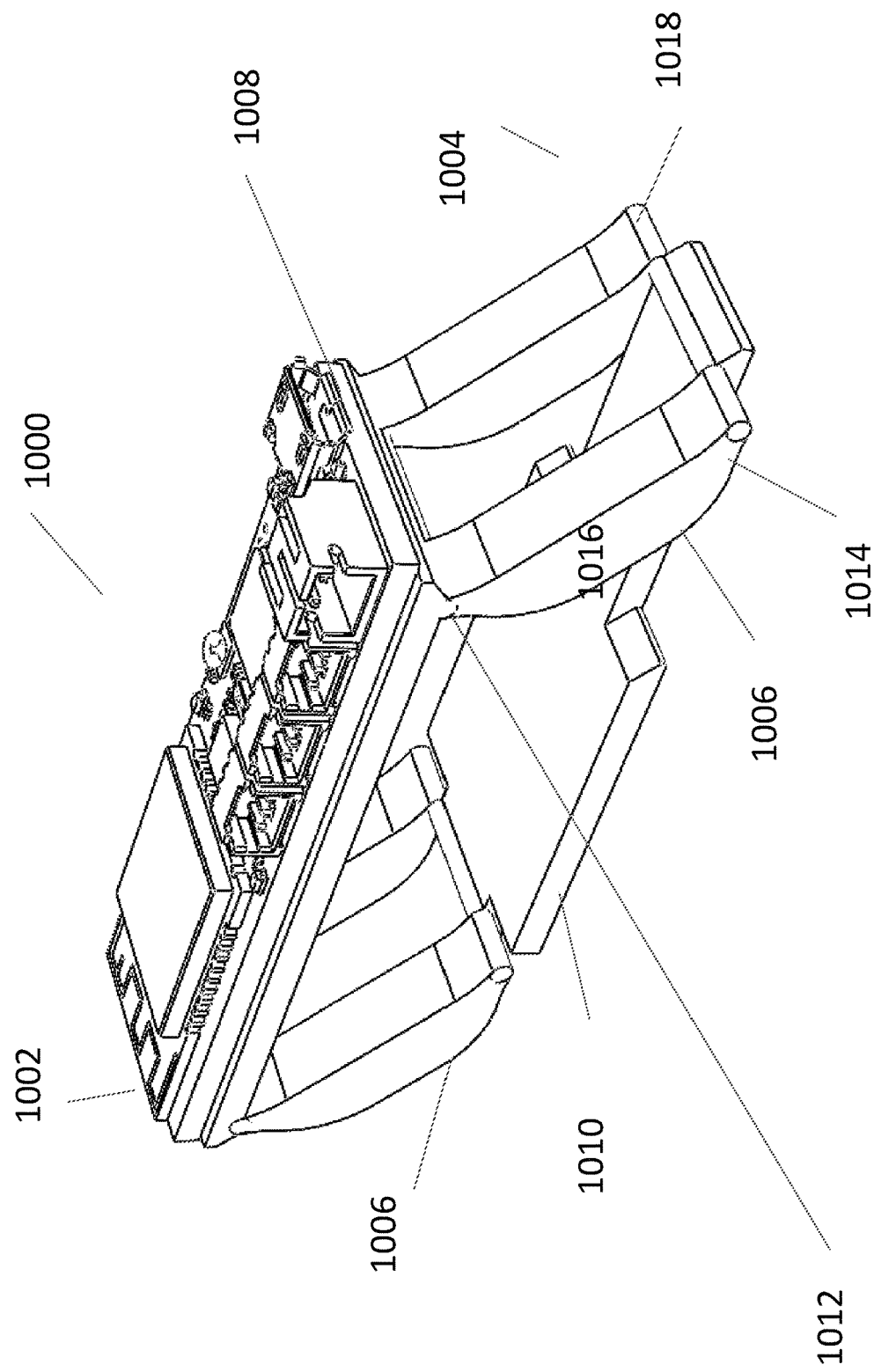
FIGS. 10A-10C show another exemplary embodiment of a damping device plus a tracker, including an exemplary configuration of the parallel mechanism haptic dampening system mounted below.
Figure 10B:
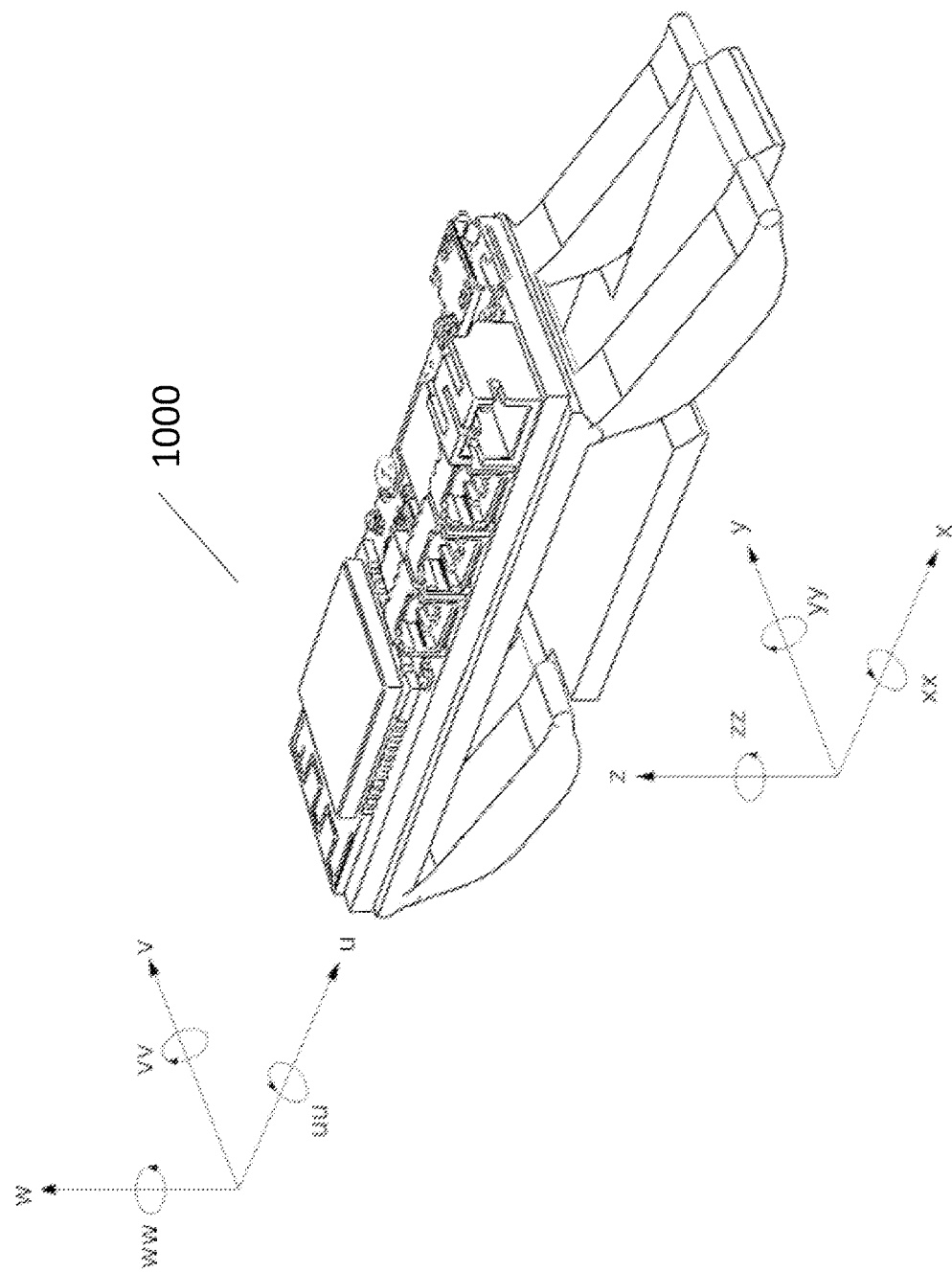
Figure 10C:
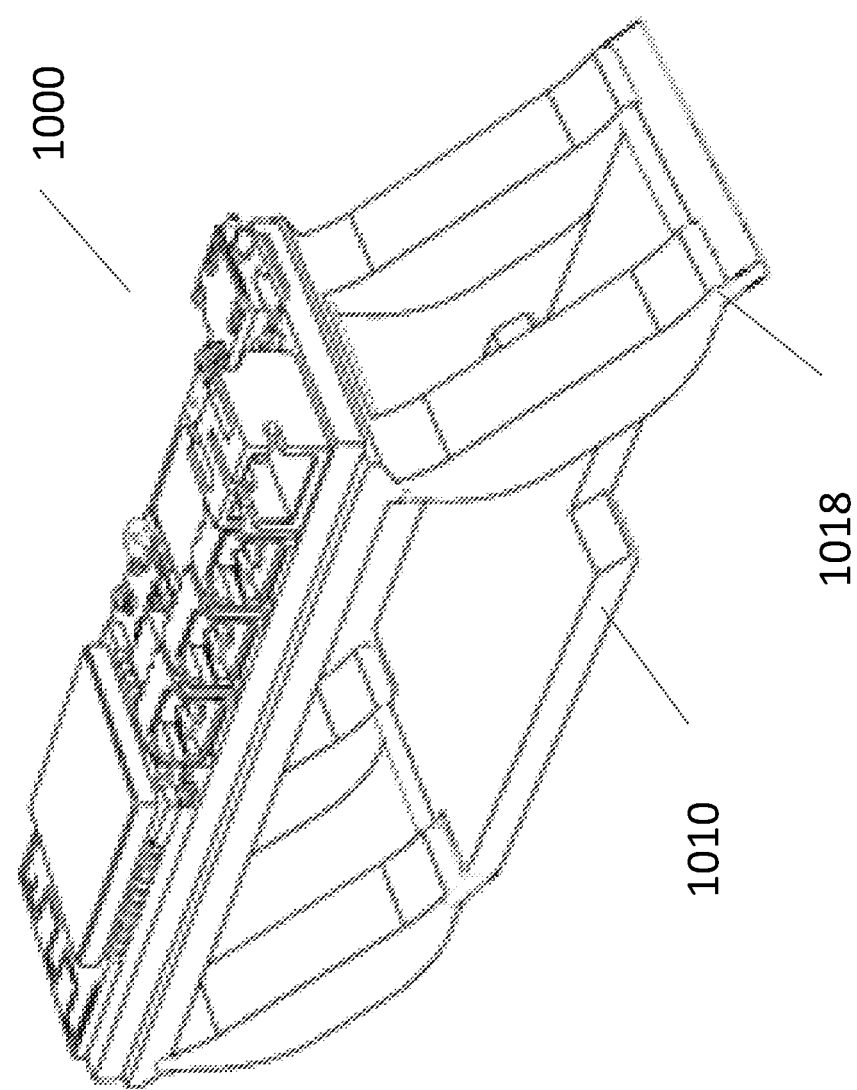

FIGS. 10A-10C show another exemplary embodiment of a damping device plus a tracker, including an exemplary configuration of the parallel mechanism haptic dampening system mounted below. FIGS. 10A and 10C show the damping device in a first position while FIG. 10B shows the damping device in a second position. The damping device features a one degree of freedom (DoF) parallel 4-bar mechanism embodiment that maintains the orientation of the IMU with respect to a plane attached to the base of a body subjected to time varying force inputs. The mechanism constrains the motion of the device except in the path along the arc of the links connecting the IMU to the base subjected to the time varying force inputs.

As shown in a system 1000, a sensor 1002 is attached to, or integrably formed with, a damping device 1004. Sensor 1002 may comprise any suitable sensor, preferably able to measure acceleration, such as for example and without limitation an accelerometer or an IMU. In this non-limiting embodiment, sensor 1002 is shown as part of a circuit board.

Damping device 1004 preferably comprises four legs 1006 as shown, arranged as a parallel 4-bar mechanism. Legs 1006 are attached at one end to a sensor mount 1008 and at an opposing end to a system mount 1010. Sensor mount 1008 and system mount 1010 are preferably maintained in a parallel orientation as shown. Sensor 1002 is attached to, or integrably formed with, sensor mount 1008. System mount 1010 may be attached to any object to be tracked (not shown).

Legs 1006 preferably comprise a material with a suitable Young's modulus as previously described. Legs 1006 also preferably have the relative dimensions shown, in which ends 1012 and 1014 are thinner than a mid-section 1016. Mid-section 1016 preferably increases in thickness from each end 1012 and 1014 until a mid-point is reached, which is preferably the thickest area of legs 1006. Mid-point may not be equidistant between ends 1012 and 1014.

Without wishing to be limited by a closed list, the variable width (thickness) of legs 1006 guides the extent and direction of the bend, as the flexible material which legs 1006 comprise bend according to applied forced inputs. Without such variable thickness, legs 1006 could bend at a point that would not maintain the parallel orientation of sensor mount 1008 and system mount 1010. Increasing the thickness at sections of legs 1006 for which bending is not desirable, which in this example is mid-section 1016, increases the second moment of the area. For example and without limitation, if mid-section 1016 is 2.14 times thicker than ends 1012 and 1014, the amount of bending stress applied at ends 1012 and 1014 is approximately four times larger than the stress applied at mid-section 1016. Preferably, mid-section 1016 is at least 1.5, 2, 2.5, 3, 3.5, 4, 4.5 or 5 times thicker than ends 1012 and 1014, or any value in between the values of from 1.5 to 5 times thicker.

The increase in thickness from each end 1012 and 1014 toward mid-section 1016 is preferably sufficiently gradual so as to reduce the speed of bending, but is sufficiently large to induce bending only at the desired locations. The angle between each end 1012 and 1014, and the remainder of leg 1006, is preferably between 25 to 90 degrees, more preferably between 30 to 60 degrees, and most preferably between 30 to 45 degrees. Preferably, the angle is initialized between a 30 or 60 degree angle to allow for damping in the front-and-back and the up-and-down directions, it is appropriate to select an angle of 15 degrees for a 30 degree initial angle and 45 degrees for a 60 degree initial angle.

Legs 1006 may also have an "S" shape as shown with regard to FIG. 1.

Preferably, ends 1014 are attached to, or integrably formed with, an additional flexible layer 1018. Layer 1018 is preferably disposed between ends 1014 and system mount 1010, to provide an extra damping effect. Layer 1018 is shown more clearly in FIG. 10C.

FIG. 10B shows system 1000 in a collapsed position; note that sensor mount 1008 and system mount 1010 maintain their parallel orientation.

FIGS. 11 and 12 illustrate stacking an IMU on top of a 3 Degree of Freedom (DoF) Parallel mechanism which allows damping in the XYZ directions for an accelerometer but maintains the orientation of the IMU so that the acceleration vector given by the IMU remains more stable for tracking. The images depict the 3 DoF mechanism with the mounted IMU in a variety of possible poses that can be achieved by the device while maintaining the orientation of the IMU parallel to the base of the parallel mechanism.

Figure 11A:
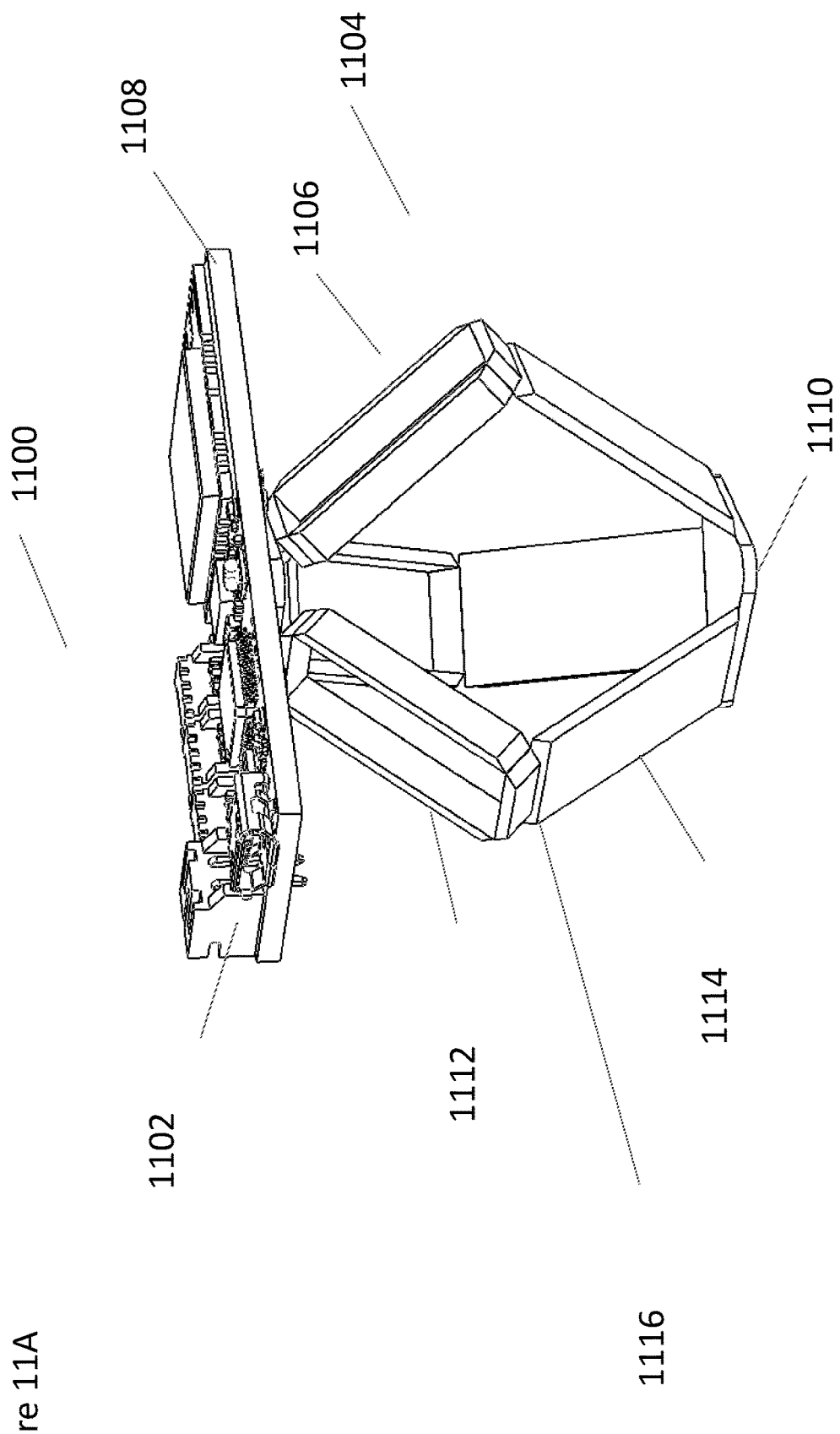
FIGS. 11A-11B show another exemplary embodiment of a damping device plus a tracker, in this illustrative example as a tripod formation.
Figure 11B:
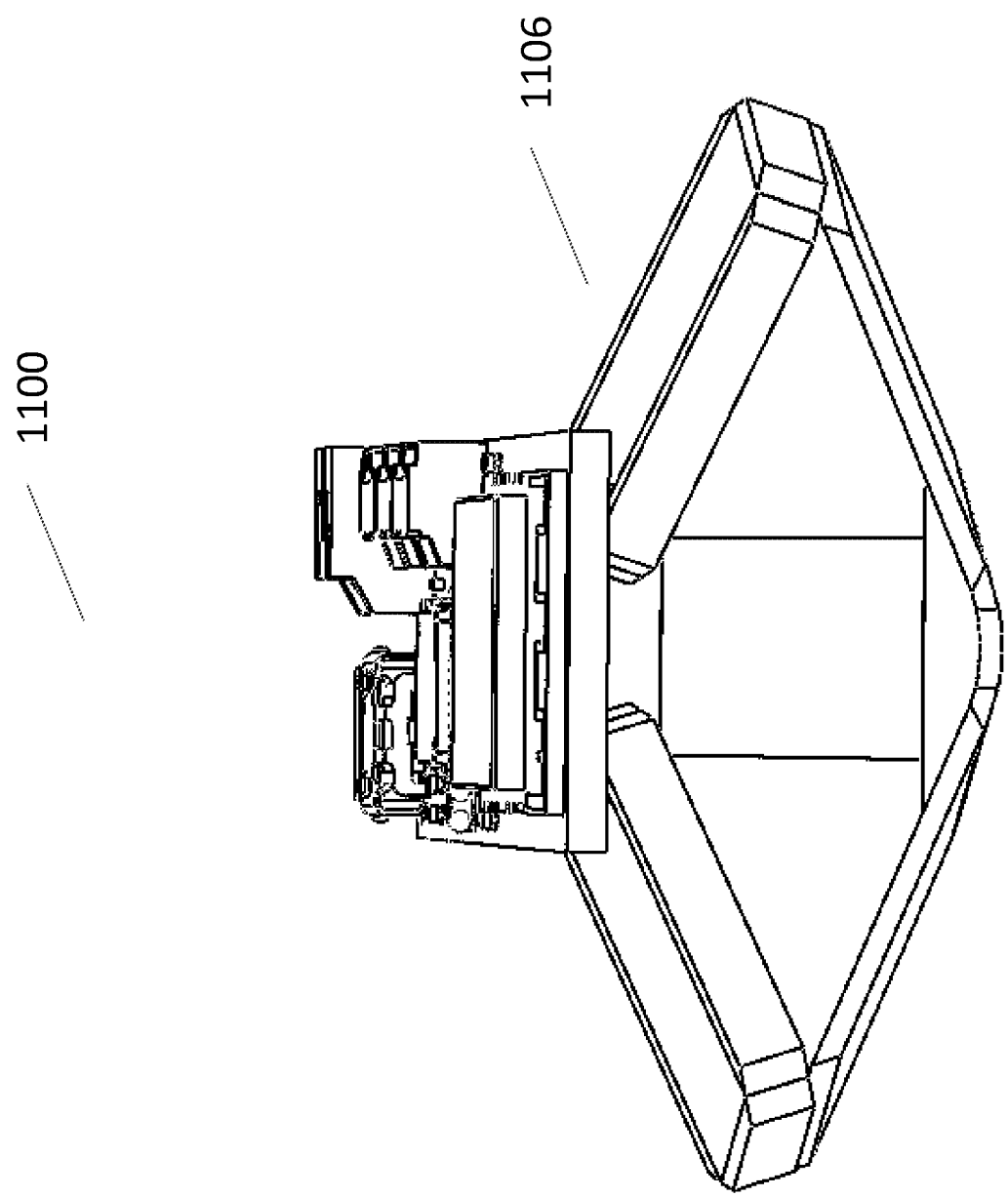

FIGS. 11A-11B show another exemplary embodiment of a damping device plus a tracker, in this illustrative example as a tripod formation. As shown in FIG. 11A, a system 1100 features a sensor 1102 that is attached to, or integrably formed with, a damping device 1104. Sensor 1102 may comprise any suitable sensor, preferably able to measure acceleration, such as for example and without limitation an accelerometer or an IMU. In this non-limiting embodiment, sensor 1102 is shown as part of a circuit board.

Damping device 1104 preferably comprises three legs 1106 as shown, arranged as a tripod delta mechanism. Legs 1106 are attached at one end to a sensor mount 1108 and at an opposing end to a system mount 1110. Sensor mount 1108 and system mount 1110 are preferably maintained in a parallel orientation as shown. Sensor 1102 is attached to, or integrably formed with, sensor mount 1108. System mount 1110 may be attached to any object to be tracked (not shown).

Each leg 1106 preferably comprises an upper section 1112 and a lower section 1114. Upper section 1112 is connected to lower section 1114 through a joint 1116, which may for example comprise a hinge as shown. Upper section 1112 preferably comprises a hollow rectangle as shown which itself forms a planar 4 bar mechanism, while lower section 1114 preferably comprises a planar sheet as shown.

As shown with regard to FIG. 11B, joint 1116 may comprise a flexible material with a suitable Young's modulus to support bending and flexing. This bending causes sensor mount 1108 to move to a lower position as shown in FIG. 11B. However, upper section 1112 and lower section 1114 preferably do not bend and are therefore preferably made of more rigid material.

Figure 12A:
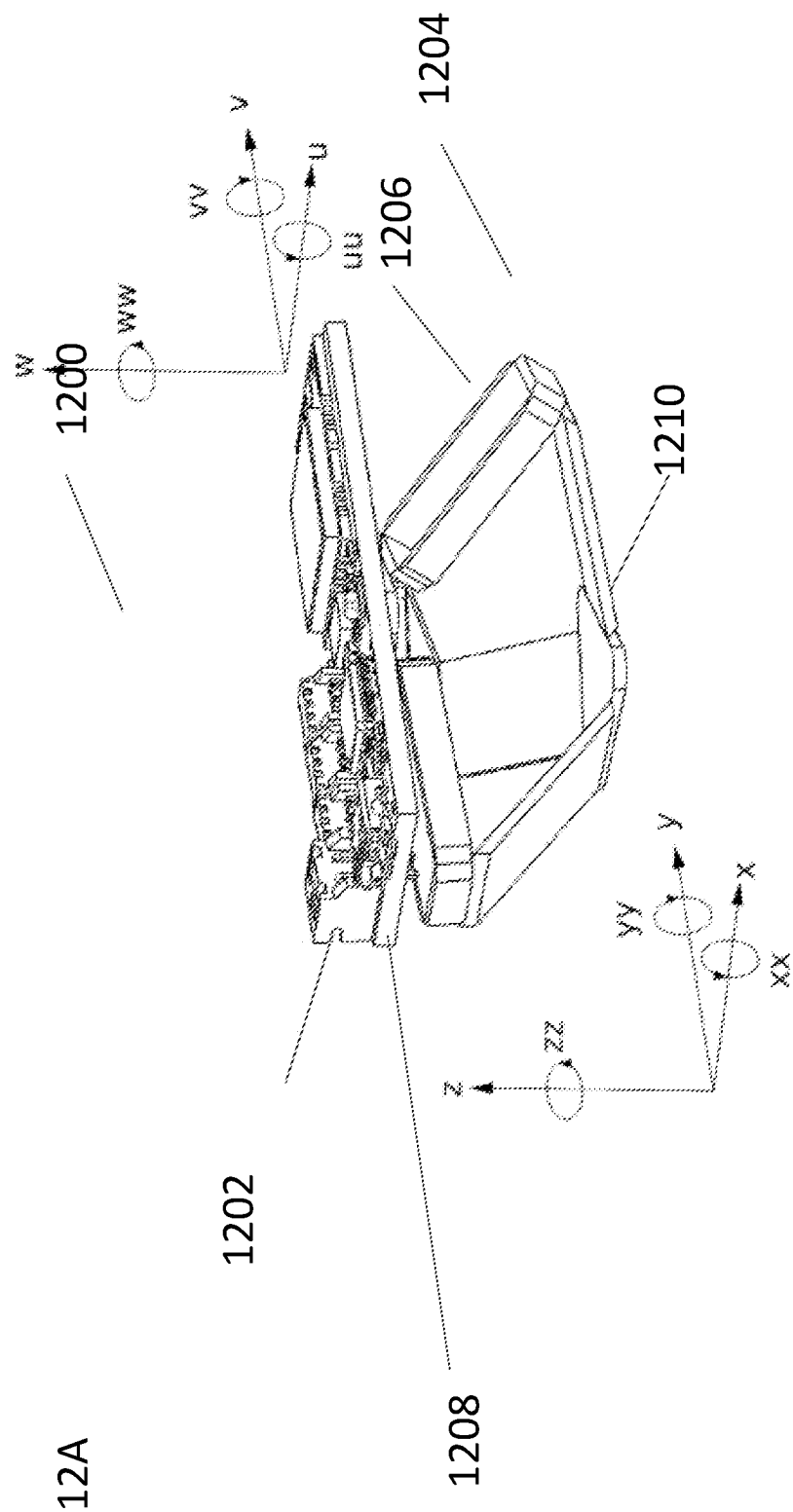
FIGS. 12A-12C show another exemplary embodiment of a damping device plus a tracker, in this illustrative example as a rhomboid formation.
Figure 12B:
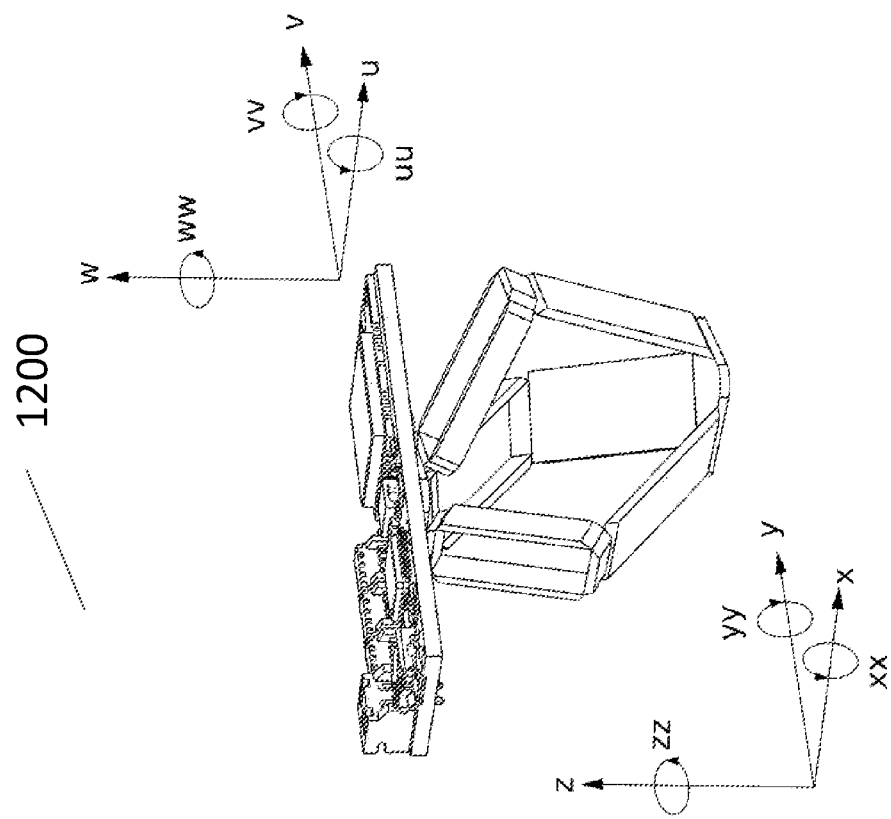
Figure 12C:
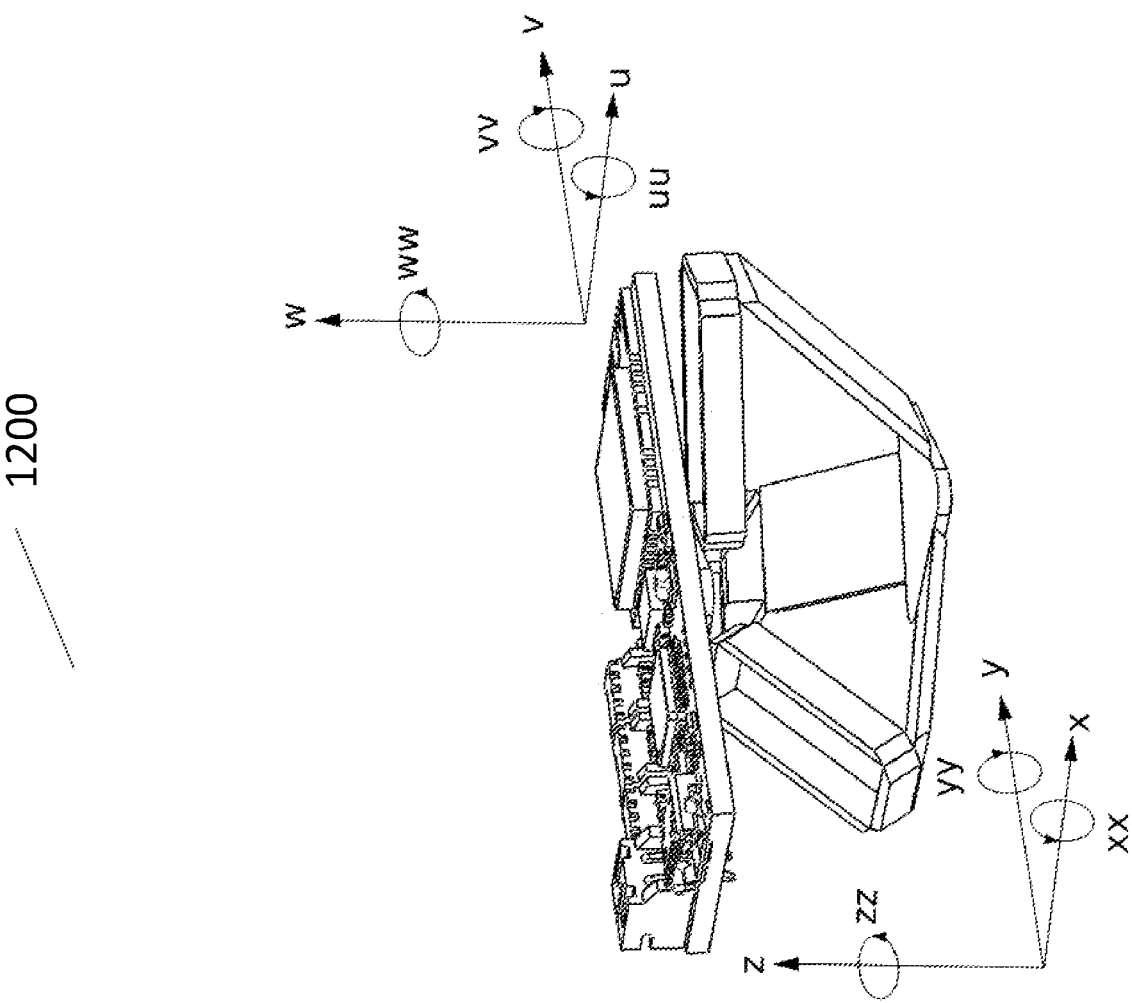

FIGS. 12A-12C show another exemplary embodiment of a damping device plus a tracker, in this illustrative example as a rhomboid formation. FIGS. 12A-12C show that there is no relative rotations uu, vv, or ww about the u, v, w axes that are attached to the body that has the IMU attached. This maintains the w and z vector are always aligned, the u and x vector are always aligned, and the v and y are always aligned. This is ideal for reducing the amplitude and frequency felt by the IMU by the forces applied to the base while still maintaining the correct orientation to track the body in space. The three images represent the delta mechanism in different configurations. Optionally, the delta mechanism is able to have a greater degree of play and flexibility than the damping device of FIG. 11.

As shown in FIG. 12A, a system 1200 features a sensor 1202 that is attached to, or integrably formed with, a damping device 1204. Sensor 1202 may comprise any suitable sensor, preferably able to measure acceleration, such as for example and without limitation an accelerometer or an IMU. In this non-limiting embodiment, sensor 1202 is shown as part of a circuit board.

Damping device 1204 preferably comprises four legs 1206 as shown, arranged as a parallel 4-bar mechanism. Legs 1206 are attached at one end to a sensor mount 1208 and at an opposing end to a system mount 1210. Sensor mount 1208 and system mount 1210 are preferably maintained in a parallel orientation as shown. Sensor 1202 is attached to, or integrably formed with, sensor mount 1208. System mount 1210 may be attached to any object to be tracked (not shown).

Each leg 1206 preferably features an open rectangular configuration as shown, so the top will always be parallel to the bottom, and the right side will always be parallel to the left side. The open rectangle is preferably in the form of a parallelogram, which enables all legs 1206 to maintain their relative orientation when bending at the top and bottom. In this orientation, the top plane remains parallel to the bottom plane and with the same or similar relative orientation.

Figure 13:
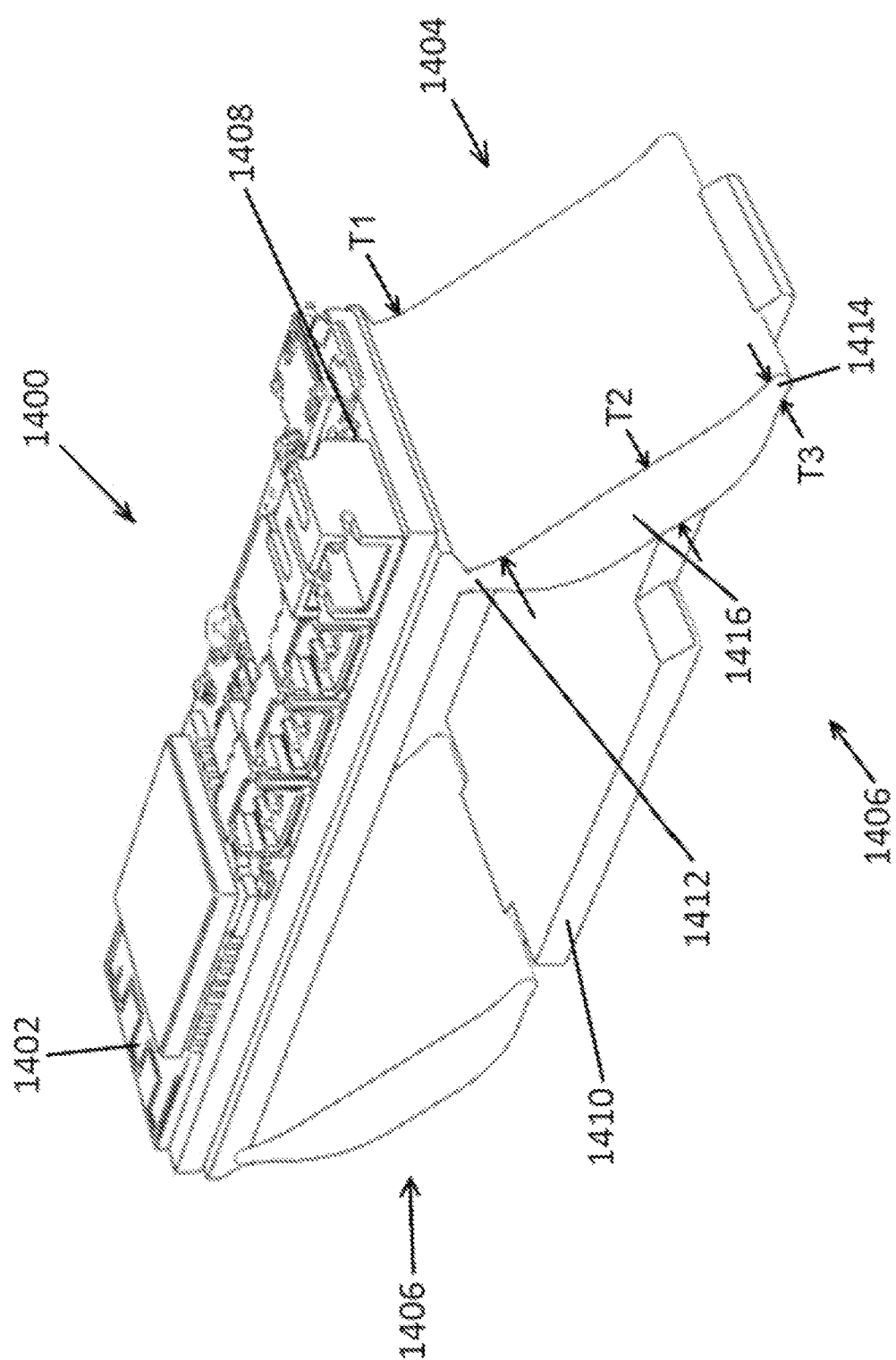
FIG. 13 shows another exemplary embodiment of a damping device plus a tracker, including an exemplary configuration of the parallel mechanism haptic dampening system mounted below.

FIG. 13 shows another exemplary embodiment of a damping device plus a tracker, including an exemplary configuration of the parallel mechanism haptic dampening system mounted below. The damping device features a one degree of freedom (DoF) parallel 4-bar mechanism embodiment that maintains the orientation of the IMU with respect to a plane attached to the base of a body subjected to time varying force inputs. The mechanism constrains the motion of the device except in the path along the arc of the links connecting the IMU to the base subjected to the time varying force inputs. The device is similar to that of FIG. 10, but only features two legs as described below.

As shown in a system 1400, a sensor 1402 is attached to, or integrably formed with, a damping device 1404. Sensor 1402 may comprise any suitable sensor, preferably able to measure acceleration, such as for example and without limitation an accelerometer or an IMU. In this non-limiting embodiment, sensor 1402 is shown as part of a circuit board.

Damping device 1404 preferably comprises two legs 1406 as shown, arranged as a parallel mechanism. Legs 1406 are attached at one end to a sensor mount 1408 and at an opposing end to a system mount 1410. Sensor mount 1408 and system mount 1410 are preferably maintained in a parallel orientation as shown. Sensor 1402 is attached to, or integrably formed with, sensor mount 1408. System mount 1410 may be attached to any object to be tracked (not shown).

Legs 1406 preferably comprise a material with a suitable Young's modulus as previously described. Legs 1406 also preferably have the relative dimensions shown, in which ends 1412 and 1414 are thinner than a mid-section 1416. Mid-section 1416 preferably increases in thickness from each end 1412 and 1414 until a mid-point is reached, which is preferably the thickest area of legs 1406. Mid-point may not be equidistant between ends 1412 and 1414.

As shown in FIG. 13, each leg 1406 has a "longitudinal" thickness T1 in a first plane, which corresponds to a front plane or front view as shown in FIGS. 2B and 3B. As also shown in FIG. 13, the longitudinal thickness T1 is generally constant along the first end 1412, the mid-section 1416, and the second end 1414. As also shown in FIG. 13, each leg 1406 has a variable "lateral" thickness in a second plane, which corresponds to a side plane or side view as shown in FIGS. 2A and 3A. Front and side planes are orthogonal to one another, so the longitudinal and lateral thicknesses are orthogonal to one another. The mid-section 1416 has a lateral thickness T2 and the second end 1414 has a lateral thickness T3. Without wishing to be limited by a closed list, the variable width (thickness such as T2 and T3) of legs 1406 guides the extent and direction of the bend, for example as described with regard to FIG. 10. For example and without limitation, preferably, the lateral thickness T2 of the mid-section 1416 is at least 1.5, 2, 2.5, 3, 3.5, 4, 4.5 or 5 times thicker than the lateral thickness T3 of the second end 1414, or any value in between the values of from 1.5 to 5 times thicker. Optionally and preferably, the width of each leg 1406, which is the longitudinal thickness T1, is at least 50%, at least 60%, at least 70%, at least 80%, at least 90%, up to 100%, of the width of system mount 1410 and/or sensor mount 1408, or any percentage value in between.

The increase in thickness from each end 1412 and 1414 toward mid-section 1416 is preferably sufficiently gradual so as to reduce the speed of bending, but is sufficiently large to induce bending only at the desired locations. The angle between each end 1412 and 1414, and the remainder of leg 1406, is preferably between 25 to 90 degrees, more preferably between 30 to 60 degrees, and most preferably between 30 to 45 degrees. Preferably, the angle is initialized between a 30 or 60 degree angle to allow for damping in the front-and-back and the up-and-down directions, it is appropriate to select an angle of 15 degrees for a 30 degree initial angle and 45 degrees for a 60 degree initial angle.

The present invention, in at least some embodiments, provides a physical damping layer that preserves orientation between an IMU being used as part of a state-estimation for a tracked body and the physical tracked controller body itself. This can be either a small physical component that an IMU could be integrated onto that could then be concluded directly on the integrated circuit preserving the circuit connections (FIG. 7) or as a physical system whereby the orientation is preserved through a physical mechanism that is damped along other translational degrees of freedom to provide the necessary reduction in acceleration to the IMU (FIGS. 1-6).

One such example use case is in virtual or augmented reality haptic controllers where controllers are tracked using sensor systems that are located off the tracked body to provide an accurate measurement of the body state at a lower refresh rate. Meanwhile, the algorithm to compute the state of the tracked object uses inertial sensor measurements on the tracked body to provide information about the system's state at much higher frequencies. These measurements, when subjected to high accelerations caused by haptic or vibratory stimuli, become erroneous and can lead to extreme degradation of the performance of the tracking algorithm. Through the use of this invention and without wishing to be limited by a closed list, it is possible to reduce the translational amplitude of acceleration experienced by an accelerometer while preserving the gyro readings and the orientation of the device. For the aforementioned use case a physical damping system can be mounted between the haptic controller and the tracking unit (FIG. 9).

This technology could also be used, but not limited to, outside-in tracking of drone technology that undergo heavy vibration due to motors but must maintain faithful attitude preservation or even creating IMU (Inertial Measurement Unit) mounts to be soldered to integrated circuit boards to be embedded directly into the electronic components themselves (FIG. 7).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A force dampening device for a sensor subjected to forced input, the device comprising:
   a plurality of legs, each of said plurality of legs extending from a first end through a mid-section to a second end, each of said plurality of legs comprised of a flexible material, wherein each of the plurality of legs have a fixed length and are non-actuated;
   a sensor mount wherein the sensor is mounted on said sensor mount;
   a system mount, wherein each of said plurality of legs is connected to said sensor mount at the first end and to said system mount at the second end such that said sensor mount is passively maintained in a parallel orientation relative to said system mount as said plurality of legs bend at said first end and said second end according to a force applied to the sensor, wherein said plurality of legs and said sensor mount and said system mount cooperatively define a parallel kinematic structure and wherein bending occurs at the first and second ends before the mid-section, and wherein said plurality of legs reduce an amount of force experienced by the sensor according to force applied to said system mount; and
   wherein each of said plurality of legs defines a first thickness in a first plane and a second thickness in a second plane, wherein said first plane and said second plane are orthogonal to one another, and wherein, for at least one said plurality of legs, a thickness of said at least one said plurality of legs is substantially constant in at least one of said first plane and said second plane and is variable in the other of said first plane and said second plane.

2. The device of claim 1, wherein said flexible material comprises a suitable semi-flexible polymer.

3. The device of claim 2, wherein said flexible material comprises a material having a Young's modulus in the range between 1 to 3 MPa, said material comprising polyethylene, viscoelastic elastomers or silicone rubber, or a combination thereof.

4. The device of claim 3, wherein said material comprises Nitrile (NRB) and Butyl (IIR) families of elastomers having mechanical properties that fall within the range of 1-3 MPa for elastic modulus, 4-10 MPa for yield stress, and 8-20 MPa for tensile strength at fracture.

5. The device of claim 1 wherein, for at least one of said plurality of legs, an angle of from 30 to 60 degrees is defined between an axis extending between (i) the first end and the second end of said at least one of said plurality of legs and (ii) one of said sensor mount and said system mount.

6. The device of claim 5 wherein said angle is further defined as from 35 to 55 degrees.

7. The device of claim 6 wherein said angle is further defined as from 40 to 50 degrees.

8. The device of claim 5 wherein said plurality of legs comprise four legs arranged in a four-bar parallelogram mechanism.

9. The device of claim 8 wherein a first leg and a second leg of said plurality of legs are engaged to a front end of said sensor mount and a front end of said system mount, a third leg and a fourth leg of said plurality of legs are engaged to a back end of said sensor mount and a back end of said system mount, and said first and second legs and said third and fourth legs are arranged equidistantly at said front ends of said sensor mount and system mount and said back ends of said sensor mount and said system mount.

10. The device of claim 8 wherein each of said plurality of legs comprises three sections, a first section connected to said sensor mount, a second section connected to said first section, and a third section disposed between and connected to said second section and said system mount, wherein said first and third sections are thinner than said second section.

11. The device of claim 10, wherein said second section becomes thicker in a graduated manner from an end nearest said first section to a midpoint, and then becomes thinner in a graduated manner from said midpoint to an end nearest said third section.

12. The device of claim 11, wherein said midpoint is not located equidistant between said first and third sections.

13. The device of claim 10, wherein said second section is from 1.5 to 5 times thicker than each of said first and third sections.

14. The device of claim 10, wherein said system mount further comprises a flexible layer comprising a flexible material, wherein said respective third sections of said plurality of legs are connected to said flexible layer of said system mount.

15. The device of claim 1 wherein said plurality of legs comprise three legs arranged in a tripod arrangement, wherein each leg comprises first and second sections and a hinge, wherein a first end of said first section of each of said three legs is connected to said sensor mount and a second end of said first section of each of said three legs is connected to said hinge, and wherein a first end of said second section of each of said three legs is connected to said hinge and a second end of each of said three legs is connected to said system mount.

16. The device of claim 1, wherein said system mount is formed as a linear rail allowing motion in one direction and further comprises a flexible material for at least partial dampening of motion.

17. The device of claim 1, wherein said legs have an S-shape.

18. A dampening system comprising:
a sensor; and
a force damping device comprising a plurality of legs, a sensor mount and a system mount cumulatively forming a parallel kinematic mechanism, wherein each of said plurality of legs comprise a flexible material, wherein each of said plurality of legs is connected to said sensor mount at a first end and to said system mount at a second end, said parallel kinematic mechanism being at least one four-bar, parallelogram linkage with respective mid-sections of said plurality of legs defining a first bar and second bar and said sensor mount defining a third bar and said system mount defining a fourth bar, said parallel kinematic mechanism configured such that said sensor mount is maintained in a parallel orientation to said system mount as said plurality of legs bend at said first and second ends according to force applied to said sensor, and wherein the sensor is mounted on said sensor mount, and wherein said plurality of legs reduce an amount of force experienced by the sensor according to force applied to said system mount, and wherein each of said plurality of legs defines a first thickness in a first plane and a second thickness in a second plane, wherein said first plane and said second plane are orthogonal to one another, and wherein, for at least one said plurality of legs, a thickness of said at least one said plurality of legs is substantially constant in at least one of said first plane and said second plane and is variable in the other of said first plane and said second plane.

19. The dampening system of claim 18, wherein said sensor is selected form the group consisting of an IMU and an accelerometer.

20. The dampening system of claim 19, further comprising a tracked body, wherein said sensor tracks a motion of said tracked body, wherein said force dampening device is situated between said sensor and said tracked body.

21. The dampening system of claim 20, wherein said tracked body is selected from the group consisting of a drone and an object for providing haptic feedback.

22. A haptic device, comprising an actuator, a sensor to measure device state, a sensor mount, a system mount, and a passive mechanical means to isolate a sensor signal in a degree of freedom of the measured device state, wherein said passive mechanical means comprises a plurality of legs disposed between said sensor and said actuator, wherein each of said legs comprises a flexible material, and wherein said plurality of legs and said sensor mount and said system mount are a parallel kinematic mechanism in the form of at least one four-bar, parallelogram linkage with respective mid-sections of said plurality of legs defining a first bar and second bar and said sensor mount defining a third bar and said system mount defining a fourth bar, and wherein each of said plurality of legs defines a first thickness in a first plane and a second thickness in a second plane, wherein said first plane and said second plane are orthogonal to one another, and wherein, for at least one said plurality of legs, a thickness of said at least one said plurality of legs is substantially constant in at least one of said first plane and said second plane and is variable in the other of said first plane and said second plane.

23. The force dampening device of claim 1 wherein said plurality of legs and said sensor mount and said system mount are a parallel kinematic mechanism in the form of at least one four-bar, parallelogram linkage with said plurality of legs defining a first bar and second bar and said sensor mount defining a third bar and said system mount defining a fourth bar.

* * * * *